(12) United States Patent
Yamamoto et al.

(10) Patent No.: US 8,728,992 B2
(45) Date of Patent: May 20, 2014

(54) GREASE COMPOSITION AND BEARING

(75) Inventors: Masamichi Yamamoto, Fujisawa (JP); Yutaka Imai, Fujisawa (JP); Jun-ichi Imai, Fujisawa (JP)

(73) Assignee: Kyodo Yushi Co. Ltd., Kanagawa (JP)

( * ) Notice: Subject to any disclaimer, the term of this patent is extended or adjusted under 35 U.S.C. 154(b) by 0 days.

(21) Appl. No.: 13/318,842

(22) PCT Filed: May 14, 2010

(86) PCT No.: PCT/JP2010/058205
§ 371 (c)(1),
(2), (4) Date: Nov. 4, 2011

(87) PCT Pub. No.: WO2010/131743
PCT Pub. Date: Nov. 18, 2010

(65) Prior Publication Data
US 2012/0046204 A1 Feb. 23, 2012

(30) Foreign Application Priority Data

May 14, 2009 (JP) .................. 2009-117586

(51) Int. Cl.
*C10M 125/18* (2006.01)
*C10M 131/00* (2006.01)
*C08F 8/34* (2006.01)
*C10M 105/72* (2006.01)
*C10M 115/08* (2006.01)

(52) U.S. Cl.
USPC ............ 508/106; 508/548; 508/568; 508/552

(58) Field of Classification Search
USPC ......................... 508/106, 548, 568
See application file for complete search history.

(56) References Cited

U.S. PATENT DOCUMENTS

| 5,773,394 A | 6/1998 | Wan et al. | |
|---|---|---|---|
| 2003/0022797 A1* | 1/2003 | Oohira et al. | ............... 508/107 |
| 2009/0005272 A1* | 1/2009 | Mikami et al. | ............... 508/108 |

FOREIGN PATENT DOCUMENTS

| CN | 1163305 | 10/1997 |
|---|---|---|
| EP | 0795598 | 9/1997 |
| JP | 57-003897 | 1/1982 |
| JP | 58-40393 | 3/1983 |
| JP | 63-24038 | 5/1988 |
| JP | 3-35091 | 2/1991 |
| JP | 2002-194373 | 7/2002 |
| JP | 2005-89667 | 4/2005 |
| JP | 2005-089667 | 4/2005 |
| JP | 2006-250323 | 9/2006 |

OTHER PUBLICATIONS

International Search Report for PCT/JP2010/058205, mailed Jun. 29, 2010.
Written Opinion of the International Searching Authority for PCT/JP2010/058205, mailed Jun. 29, 2010.
Chinese Office Action issued for corresponding Chinese Patent Application No. 201080020484.6, dated Dec. 4, 2012.

\* cited by examiner

*Primary Examiner* — Vishal Vasisth
(74) *Attorney, Agent, or Firm* — Nixon & Vanderhye P.C.

(57) ABSTRACT

The invention provides a grease composition containing a thickener, a base oil and an antistatic agent, where the antistatic agent includes at least one selected from the group consisting of $Li(CF_3SO_2)_2N$ and $Li(CF_3SO_2)_3C$; and a mechanical part where the above-mentioned grease composition is packed. The composition of the invention shows satisfactory results in the antistatic properties and the acoustic property.

8 Claims, No Drawings

US 8,728,992 B2

GREASE COMPOSITION AND BEARING

This application is the U.S. national phase of International Application No. PCT/JP2010/058205, filed 14 May 2010, which designated the U.S. and claims priority to Japan Application No. 2009-117586, filed 14 May 2009, the entire contents of each of which are hereby incorporated by reference.

TECHNICAL FIELD

The present invention relates to a grease composition and a mechanical part. More particularly, the present invention relates to a grease composition to be packed into rolling bearings and various mechanical parts used in, for example, automotive electrical equipment and automotive auxiliaries (such as alternators, center pulleys, electromagnetic clutches for automobile air conditioners, water pumps, electric fan motors and the like), a variety of motors (such as air-conditioning fan motors, spindle motors, cleaner motors and the like), and office automation (OA) equipment and household electrical appliances (such as photoconductive drums and fixing rollers of copiers, various fan motors and the like), a grease composition used for the portions where the charged mechanical parts may have an adverse effect on the surrounding control equipment, the portions where electrolytic corrosion may produce the problem, or the portions required to show a desired acoustic property; and a mechanical part containing the grease composition therein.

BACKGROUND ART

Generally, the grease composition uses as the base oil mineral oils such as paraffinic oils and naphthenic oils or synthetic oils such as ester-based synthetic oils, synthetic hydrocarbon oils, ether-based synthetic oils and the like. Those base oils themselves show considerably high volume resistivities. Therefore, it is known that the bearing or mechanical part filled with a grease composition containing any of the above-mentioned base oils becomes an insulator, thereby being electrically charged by the actions of rotation or sliding.

For example, in the automotive electrical equipment and automotive auxiliaries, a belt is rotated by driving pulleys, to generate static electricity between the belt and the pulleys, which are electrically charged. The charged parts thus cause the problem of adversely affecting the surrounding control equipment.

Further, the motor bearing is also electrically charged. When a large difference in electric potential is generated between the inner and outer rings, a current flows through a thin lubricating oil film to cause sparking, which will produce the problem of so-called electrolytic corrosion where the rolling surface of the bearing and the contact surface of the rolling elements are impaired.

To solve the problems caused by such a high volume resistivity of grease, the grease compositions containing antistatic agents are known.

For example, a grease composition containing carbon black as the electric conductive material is known (JP 63-24038 B). However, the carbon black is in the form of particles and insoluble in oil, so that there are the following disadvantages: noise is developed by oscillation when the grease comes into the rolling surface of the bearing, and the electric conductivity is lowered by fracture of the chain structure in the carbon black particles when shearing force is applied to the particles while in use. Further, a large amount of carbon black is needed to impart electric conductivity to the grease composition. However, the addition of a large amount of carbon black will result in thickening of the obtained grease composition because the carbon black has a thickening property.

There is also proposed an electric conductive grease comprising chromium alkyl salicylate and fatty acid calcium salt as the antistatic agents and dialkyl dimethyl ammonium chloride as an oil-soluble surfactant (JP 03-35091 A). However, those compounds unfavorably have an adverse effect on the human body and apply a load on environment. Another problem is that those compounds are insoluble in some oils.

There is also proposed a lubricant where Sb-containing tin oxide particles are homogeneously mixed in an amount of 5 to 50%, the particles having an average particle diameter of 1.0 μm or less and a content of antimony (Sb) of 0.1 to 20 mass % (JP 58-40393 A). The above-mentioned lubricant is not preferred because of the adverse effect on the human body and the load on environment. In addition, those particles are disadvantageous in consideration of the acoustic property.

A lubricant comprising an ionic liquid as the antistatic agent in the base oil is proposed (JP 2006-250323 A). However, there are the problems that the ionic liquid is expensive and shows a low compatibility with petroleum base oils and other additives.

There is proposed a lubricant comprising as the antistatic agents an ionic liquid and a lithium compound (JP 2005-89667 A). However, it has not been clarified whether the lubricant can impart the antistatic properties to a resultant grease composition without impairing the acoustic property of the grease composition when used as the additive for the grease composition.

SUMMARY OF INVENTION

Technical Problem

An object of the invention is to provide a grease composition having excellent antistatic properties and a good result in terms of acoustic property.

Another object is to provide a mechanical part where the above-mentioned grease composition is packed.

Solution to Problem

As a result of extensive studies to solve the above-mentioned problems, the inventors of the present invention found that a particular additive can noticeably reduce the charging tendency of the grease composition and show a good acoustic property. The invention has been thus accomplished based on the above findings. The invention provides a grease composition and a mechanical part as shown below.

(1) A grease composition comprising a thickener, a base oil and an antistatic agent, wherein the antistatic agent comprises at least one selected from the group consisting of $Li(CF_3SO_2)_2N$ and $Li(CF_3SO_2)_3C$.

(2) The grease composition described in the above-mentioned (1), wherein the antistatic agent is contained in an amount of 0.01 to 10 mass % with respect to the total mass of the grease composition.

(3) The grease composition described in the above-mentioned (1) or (2), designed for rolling bearings.

(4) A mechanical part in which the grease composition described in any one of the above-mentioned (1) to (3) is packed.

Advantageous Effects of Invention

The antistatic agent specified by the invention can conspicuously prevent the grease composition from becoming charged, even when added in small amounts. When the grease composition of the invention is packed in the rolling bearings and various mechanical parts of, for example, automotive electrical equipment and automotive auxiliaries (such as alternators, center pulleys, electromagnetic clutches for automobile air conditioners, water pumps, electric fan motors and the like), a variety of motors (such as air-conditioning fan motors, spindle motors, cleaner motors and the like), and office automation (OA) equipment and household electrical appliances (such as photoconductive drums and fixing rollers of copiers, various fan motors and the like), it is possible to prevent the surrounding control equipment from being adversely influenced by the mechanical parts which may otherwise electrically charged, and prevent the problem of electrolytic corrosion from occurring, while excellent acoustic property can be exhibited.

DESCRIPTION OF EMBODIMENTS

The antistatic agent used in the invention is at least one selected from the group consisting of $Li(CF_3SO_2)_2N$ and $Li(CF_3SO_2)_3C$, which are compounds widely used as the electrolytes for lithium ion battery. Desirably, those solid compounds may be dissolved in a proper solvent for practical use.

The above-mentioned solvent is not particular limited. Examples of the solvent include mineral oils such as paraffinic oils and naphthenic oils, ester-based synthetic oils including diester oils and polyol ester oils, ether-based synthetic oils such as alkyl diphenyl ether oils, alkylnaphthalenes and the like, which are all used as the base oils. Further, the compounds having in the molecule thereof a polar group, ether linkage or ester linkage, such as phosphoric ester, sorbitan trioleate, succinic acid ester, succinic acid half ester, thiadiazole and the like are also usable. Examples of the compound having ester linkage include esters of benzoic acid, adipic acid, sebacic acid, phthalic acid, succinic acid and the like.

Those compounds may be used alone or in combination.

The content of the antistatic agent in the grease composition of the invention may preferably be 0.01 to 10 mass %, more preferably 0.05 to 5 mass %, and most preferably 0.1 to 3 mass %, with respect to the total mass of the grease composition. When the content is less than 0.01 mass %, a desired effect may not be completely obtained. The content exceeding 10 mass % is uneconomical because the effect is already attained. Although the antistatic agents used in the invention, i.e., $Li(CF_3SO_2)_2N$ and $Li(CF_3SO_2)_3C$, are commercially available as solvent cutback type products, the term "content" mentioned above should be recognized to be the effective amount.

The thickener used in the grease composition of the invention is not particularly limited. Any thickeners that can be generally used in the grease compositions are usable. For example, there can be used metallic soaps containing Li, Na or the like; and non-soap type thickeners such as Benton (bentonite), silica gel, urea compounds, fluorine-containing thickeners, e.g., polytetrafluoroethylene and the like. In particular, urea compounds and Li soaps are preferred.

In the urea compounds, diurea compounds, particularly diurea compounds prepared by reacting an aromatic diisocyanate with an aromatic amine, aliphatic amine, alicyclic amine or the mixture thereof can be preferably used. Specific examples of the aromatic diisocyanate include tolylene diisocyanate, diphenylmethane diisocyanate, naphthalene diisocyanate and the like. Specific examples of the aromatic amine include para-toluidine, aniline, naphthylamine and the like. Specific examples of the aliphatic amine include octylamine, nonylamine, decylamine, undecylamine, dodecylamine, tridecylamine, tetradecylamine, pentadecylamine, hexadecylamine, heptadecylamine, octadecylamine, nonyldecylamine, eicosylamine, and the like. Specific examples of the alicyclic amine include cyclohexylamine and the like. For the reaction, one mole of the aromatic diisocyanate may be reacted with two moles of the amine, generally.

The Li soaps include Li soaps and Li complex soaps. Examples of the Li soap include lithium 12-hydroxystearate, lithium stearate and the like; and examples of the Li complex soap include a mixture of a reaction product of 12-hydroxystearic acid with lithium hydroxide and a reaction product of azelaic acid with lithium hydroxide, and the like. For the reaction, one mole of lithium hydroxide may be reacted with one mole of monovalent carboxylic acid or 0.5 moles of bivalent carboxylic acid.

Those thickeners are practical because they have less disadvantages and are not expensive. The thickeners may be used alone or in combination.

The thickener may be contained in such an amount as to obtain the required consistency, and preferably in an amount of 3 to 30 mass %, more preferably 5 to 25 mass %, with respect to the total mass of the grease composition.

The base oil used in the grease composition of the invention is not particularly limited. Any base oils, such as mineral oils, synthetic oils and the like can be used. Examples of the synthetic oils include ester-based synthetic oils such as diester oils and polyol ester oils; synthetic hydrocarbon oils such as poly α-olefin; ether-based synthetic oils such as alkyldiphenyl ether oils, synthetic polyglycol oils such as polypropylene glycol; synthetic silicone oils; synthetic fluorine-containing oils and the like.

In particular, mineral oils, alkyldiphenyl ether oils, dipentaerythritol ester oils, pentaerythritol ester oils and the like are preferably used. Those base oils may preferably have a kinetic viscosity of 5 to 400 $mm^2/s$, and more preferably 10 to 300 $mm^2/s$ at 40° C.

Those base oils can be used alone or in combination.

When necessary, the grease composition of the invention may further comprise various additives commonly used for grease compositions. For example, other antistatic agents, antioxidants, rust preventives, metal corrosion inhibitors, oiliness improvers, surfactants, antiwear agents, extreme pressure agents, solid lubricants, anti-flaking additives and the like can be used.

It is not intended that the antistatic mechanism of the antistatic agents ($Li(CF_3SO_2)_2N$ and $Li(CF_3SO_2)_3C$) used in the grease composition of the invention should be bound to the following, but supposed to be as follows: Those compounds have a structure where a fluoroalkyl group is attached to the outside of sulfonyl group. Due to the strong electron-attracting power of fluorine, negative charges are further drawn in an outward direction, thereby easily separating Li ions by dissociation and thus easily conducting a current by ion conduction.

The grease composition of the invention is excellent in the antistatic properties, and preferably shows a volume resistivity of less than $50.0 \times 10^7$ Ωm, more preferably less than $20.0 \times 10^7$ Ωm when measured by the test method to be described later.

The grease composition of the invention shows a good acoustic property. The increase in Anderon value measured by the test method to be described later may preferably be less than 2 Anderon, more preferably less than 1 Anderon.

The invention will now be explained more specifically by referring to the following examples.

EXAMPLES AND COMPARATIVE EXAMPLES

Base Grease A

Thickener: diurea compound (a reaction product of two moles of p-toluidine with 1 mole of tolylene diisocyanate)
Base oil: alkyl diphenyl ether oil (with a kinetic viscosity of 97.0 mm$^2$/s at 40° C.)

Base Grease B

Thickener: diurea compound (a reaction product of a mixture (two moles) of cyclohexylamine (one mole) and stearylamine (one mole) with diphenylmethane diisocyanate (one mole))
Base oil: dipentaerythritol ester oil (with a kinetic viscosity of 79.0 mm$^2$/s at 40° C.)

Base Grease C

Thickener: lithium 12-hydroxystearate
Base oil: pentaerythritol ester (with a kinetic viscosity of 30.8 mm$^2$/s at 40° C.)

Base Grease D

Thickener: Li-complex (a mixture of a reaction product of 12-hydroxystearic acid (two moles) with lithium hydroxide (two moles) and a reaction product of azelaic acid (one mole) with lithium hydroxide (two moles))
Base oil: mineral oil (with a kinetic viscosity of 98.8 mm$^2$/s at 40° C.)

To the above-mentioned base greases, the following additives were added to prepare grease compositions with a consistency grade No. 2 as shown in Tables 1 and 2.

Additives
  Additive (a): antistatic agent Li(CF$_3$SO$_2$)$_2$N
  Additive (b): antistatic agent Li(CF$_3$SO$_2$)$_3$C
  Additive (c): carbon black <Test Methods>

According to the following test methods, the antistatic properties and the acoustic property of the greases were evaluated. The results are shown in Table 1 and Table 2.

Volume resistivity (Test for Rating the Antistatic Properties of Greases)
  Test method: In accordance with JIS C2101 24
  Test procedures: A grease composition was charged into a gap between the electrodes of a simple electrode system designed for grease, with no air bubbles there between. A voltage was applied, and the resistivity was read one minute later to calculate the volume resistivity. The applied voltage was set to 100 V and the temperature was adjusted to 25° C. for the measurement.

Evaluation Criteria:
  Volume resistivity of less than 50.0×10$^7$ Ωm: acceptable (o)
  Volume resistivity of 50.0×10$^7$ Ωm or more: not acceptable (x)

Sound Test (Test for Rating the Acoustic Property of Grease)
  Test method: test by use of an Anderonmeter
  Test conditions: bearing 608, number of revolutions: 1800 rpm, thrust load: 2 kgf, amount of grease filled: 0.35 ml, testing time: 60 seconds Evaluation Criteria:
  The increase in Anderon value=(maximum Anderon value of the grease where any additive was added to the base grease during the testing time of 60 seconds)−(maximum Anderon value of the base grease during the testing time of 60 seconds)
  Increase in Anderon value of less than 2: acceptable (o)
  Increase in Anderon value of 2 or more: not acceptable (x)

Overall Evaluation
  Satisfied (o): Both of the volume resistivity and the sound test result were acceptable.
  Not satisfied (x): Either of the volume resistivity or the sound test result was acceptable.

TABLE 1

|  |  | Examples | | | | | |
| --- | --- | --- | --- | --- | --- | --- | --- |
|  |  | 1 | 2 | 3 | 4 | 5 | 6 |
| Base grease |  | A | A | A | B | C | D |
| Additive (a) (mass %) |  | 0.1 | 1.0 | 3.0 |  |  |  |
| Additive (b) (mass %) |  |  |  |  | 1.0 | 1.0 | 1.0 |
| Additive (c) (mass %) |  |  |  |  |  |  |  |
| Worked penetration |  | 280 | 280 | 280 | 280 | 280 | 280 |
| Antistatic properties | Volume resistivity (×10$^7$ Ωm) | 10.7 | 4.1 | 3.5 | 7.4 | 2.8 | 3.2 |
|  | Evaluation | o | o | o | o | o | o |
| Acoustic Property | Increase in Anderon value | 0 | 0.2 | 0.1 | 0 | 0 | 0 |
|  | Evaluation | o | o | o | o | o | o |
| Overall evaluation |  | o | o | o | o | o | o |

TABLE 2

|  |  | Comparative Examples | | | | |
| --- | --- | --- | --- | --- | --- | --- |
|  |  | 1 | 2 | 3 | 4 | 5 |
| Base grease |  | A | B | C | D | C |
| Additive (a) (mass %) |  |  |  |  |  |  |
| Additive (b) (mass %) |  |  |  |  |  |  |
| Additive (c) (mass %) |  |  |  |  |  | 1.0 |
| Worked penetration |  | 280 | 280 | 280 | 280 | 280 |
| Antistatic properties | Volume resistivity (×10$^7$ Ωm) | 3800 | 1300 | 150 | 510 | 120 |
|  | Evaluation | x | x | x | x | x |
| Acoustic Property | Increase in Anderon value | 0 | 0 | 0 | 0 | 3.7 |
|  | Evaluation | o | o | o | o | x |
| Overall evaluation |  | x | x | x | x | x |

All the grease compositions of Examples 1 to 6 comprising as the antistatic agent the additive (a) (Li(CF$_3$SO$_2$)$_2$N) or the additive (b) (Li(CF$_3$SO$_2$)$_3$C) according to the invention showed the volume resistivities lower than the border line determining the acceptance level (50.0×10$^7$ Ωm), and also showed excellent results in the acoustic property.

In contrast to this, when compared with the grease compositions of the Examples, all of the grease compositions containing no antistatic agent according to Comparative Examples 1 to 4 showed the volume resistivities higher than the border line (50.0×10$^7$ Ωm).

The grease composition of Comparative Example 5, which employed the additive (c), i.e., carbon black instead of the additive (b), i.e., Li(CF$_3$SO$_2$)$_3$C as employed in Example 5 showed the volume resistivity higher than that in Example 5 and also higher than the border line (50.0×10$^7$ Ωm); and showed poor results in the acoustic property.

The above-mentioned results demonstrate that the grease composition containing the antistatic agent according to the invention can show the decreased volume resistivity, so that it becomes possible to prevent the mechanical parts from being charged, and exhibit satisfactory performance in terms of acoustic property.

The invention claimed is:

1. A grease composition comprising a thickener, a base oil and an antistatic agent, wherein the antistatic agent comprises at least one selected from the group consisting of $Li(CF_3SO_2)_2N$ and $Li(CF_3SO_2)_3C$, wherein the thickener is a urea compound selected from the group consisting of a diurea compound prepared by reacting p-toluidine with tolylene diisocyanate and a diurea compound prepared by cyclohexylamine and stearylamine with diphenylmethane diisocyanate, and the base oil is selected from the group consisting of an alkyldiphenyl ether oil, a dipentaerythritol ester oil, a pentaerythritol ester oil and combination thereof, wherein the grease composition has a volume resistivity of less than $50.0 \times 10^7$ Ωm.

2. The grease composition of claim 1 wherein the base oil is selected from the group consisting of a dipentaerythritol ester oil, a pentaerythritol ester oil and combination thereof.

3. The grease composition of claim 1, wherein the base oil is selected from the group consisting of a dipentaerythritol ester oil and combination of an alkyldiphenyl ether oil and a dipentaerythritol ester oil.

4. The grease composition of claim 1, wherein the antistatic agent is $Li(CF_3SO_2)_3N$.

5. The grease composition of claim 1, wherein the antistatic agent is $Li(CF_3SO_2)_3C$.

6. The grease composition of claim 1, wherein the antistatic agent is contained in an amount of 0.01 to 10 mass % with respect to the total mass of the grease composition.

7. The grease composition of claim 1, which is used for rolling bearings.

8. A mechanical part in which the grease composition of claim 1 is packed.

* * * * *